April 6, 1954  H. R. GRAYBILL  2,674,679
AUTOMATIC ASSEMBLING AND WELDING APPARATUS
Filed Feb. 25, 1952  3 Sheets-Sheet 1

INVENTOR
HERSHEY R. GRAYBILL
BY
William A. Zaleski
ATTORNEY

April 6, 1954  H. R. GRAYBILL  2,674,679
AUTOMATIC ASSEMBLING AND WELDING APPARATUS
Filed Feb. 25, 1952  3 Sheets-Sheet 3

INVENTOR
HERSHEY R. GRAYBILL
BY
William A. Zaleski
ATTORNEY

Patented Apr. 6, 1954

2,674,679

UNITED STATES PATENT OFFICE 2,674,679

AUTOMATIC ASSEMBLING AND WELDING APPARATUS

Hershey Roy Graybill, Manheim, Pa., assignor to Radio Corporation of America, a corporation of Delaware Application February 25, 1952, Serial No. 273,217

22 Claims. (Cl. 219—6)

This invention relates to an assembling and welding apparatus and more particularly to an automatic assembling and welding apparatus for joining metal components in one or more welds for forming an integral structure.

One element used in the gun assembly of cathode-ray tubes comprises a tubular structure including two troughed half-plates having radially and outwardly extending longitudinal edge portions or wings joined in welds to form welded seams. The edge portions referred to also include ears for engaging fixing means, usually ceramic rods, for fixing the tubular structure in the gun assembly.

Heretofore, the troughed half-plates referred to have been joined to form tubular structures by spot welding in a relatively slow manual operation. This operation required a relatively large number of operators and units of equipment. Furthermore, the manual operation referred to lacked desired uniformity. Since the tubular structure constitutes an electrode element having a critical function in a gun assembly, the aforementioned lack of uniformity represented a serious problem.

One respect in which the tubular structure referred to lacked uniformity was caused by faulty registry of the edge portions to be joined. This faulty registry in some instances was the consequence of inadequate support of the half-plates during a welding operation, and the tendency of spot welding electrodes to displace the plates from an original critical position for welding.

A further respect in which the tubular structure aforementioned lacked uniformity was that the half-plates used to form the structure were sometimes deformed during handling prior to assembly so that even though registry of the edge portions of the plates was accomplished to a satisfactory degree, the half plates failed to form a tubular structure having a desired round cross-section.

Furthermore, where the tubular structure is used as an electrode in an electron gun assembly, it is desirable that the end portions of the structure be free from irregularity, such as might be occasioned when the weld is extended to the ends of the structure. Spot welding involves formation of discrete irregularities, which if relatively close to an end of the structure, are objectionable in that they adversely affect desired uniformity at such end. To avoid this objection, it has been the practice to deliberately start the first spot weld a predetermined distance from an end of the structure and to dispose the final weld a short distance from the other end thereof. This practice has not been entirely successful mainly for two reasons.

When the welding operation is performed manually, as heretofore, it is difficult to fix critically the spacing between terminal welds and the ends of the welded structure. Therefore, this spacing is likely to vary from structure to structure with consequent lack of uniformity of the electron gun assemblies in which the structures are incorporated. Furthermore, spot welding involves application of an appreciable pressure to a relatively small area of the parts to be welded. This results in some deformation of adjacent areas. When such adjacent areas are end portions of the structure, objectionable irregularities as aforementioned occur therein.

While the foregoing serious objections to the practice of manually welding half-plates to form a tubular structure for use in an electron gun, were recognized in the prior art, a mechanization of the welding operation was discouraged because of several apparently unsurmountable problems. One serious problem in mechanizing the welding operation involves provision of a loading station at which the half-plates can be fed to a machine in desired face registering relation, particularly when some of the half-plates are deformed prior to loading.

A further problem involved a desired rigid support of the half-plates during a welding operation to prevent relative movement thereof in response to deformity in the half-plates or to the pressure of welding electrodes. When an entire edge portion is to be welded, as in the type of structure discussed, the problem of support is serious. In addition to preventing relative movement of the half-plates during a welding operation, the support referred to should also involve restraint to deformation of areas adjacent the weld location, which usually becomes deformed by the small area pressure applied by the welding electrodes.

Where the welding electrodes are resiliently mounted at one location and the work pieces are moved across the electrodes, according to an arrangement preferred to reduce the length of the leads required for the electrodes and the usual massiveness of the electrode supporting structure, the problem of rigid support for the work pieces, as aforementioned becomes more difficult. This is because the characteristic of rigidity of the support is opposed to movement of the work pieces supported.

A further problem in mechanizing a welding operation of the type discussed is presented by the requirement that the ends of the welded structure should be free from the irregularity caused by a weld extending thereto. This calls for a start of energization of the welding electrodes shortly after the leading ends of work pieces have passed the electrodes, and a stopping of the energization prior to complete traverse of the electrodes by the work pieces, so as to leave the ends of the structure free from welds.

It is therefore an object of the invention to provide an improved apparatus for automatically assembling and welding work pieces to form a desired structure of critical shape.

A further object is to provide an apparatus for assembling and welding half-plates to form an electrode of improved utility in an electron gun.

Another object is to provide an improved loading mechanism for a welding apparatus.

A further object is to provide improved supporting or guiding means for work pieces in a welding apparatus.

Another object is to provide a guiding means in a welding apparatus that rigidly supports work pieces for travel to welding electrodes and engages areas of the work pieces adjacent the region of a weld during a welding operation to prevent deformation of such areas.

A further object is to provide a welding apparatus having electrodes successively engaging continuous portions of work pieces from one end thereof to the other to reduce deformation of the work pieces by the pressure of the electrodes.

Another object is to provide an improved switching means for a welding apparatus whereby the energization of welding electrodes is controlled to avoid welds at the ends of a welded structure.

A further object is to provide an assembling and welding apparatus having improved means for registering work pieces loaded thereon in non-registering relation and preserving the registered relation of the work pieces during travel thereof to welding electrodes and until a weld is accomplished.

Another object is to provide loading and guiding means for a welding apparatus whereby deformed work pieces are flexed into desired form.

A further object is to provide an assembling and welding apparatus wherein a pushing means for causing work pieces to travel from station to station in the apparatus, also serves as a registering means and a switch tripping means, whereby automatic operation of the apparatus is facilitated.

In accordance with one embodiment of the invention, an automatic welding apparatus is provided for welding trough-shaped half-plates having edge flanges or wings for welding and ears extending from the flanges for fixing the tubular structure formed after welding, in an electron gun assembly.

The apparatus, according to the invention, may comprise one or more of a plurality of novel elements. Particular advantage is secured when all the elements are combined in one apparatus. However, distinct advantage also results when one or less than all of the elements referred to are utilized in an apparatus.

The elements, any one of which may characterize an apparatus according to the invention, comprise a loading and flexing means, a combined feeding and registering means, a guiding means, a welding means, and a switching means for controlling energization of the welding means.

Referring briefly to the aforementioned elements, the loading means includes a structure having spaced receiving portions for receiving two manually loaded half-plates in axially spaced and laterally off-set relation and flexing one of the half-plates to desired shape. The combined registering and feeding means comprises a chain supported member extending into the loading means and movable to first engage an end of one of the half-plates for moving it into face registry with the other half-plate and then to move both of the half-plates in registered position in a predetermined path. Adjacent said loading means and disposed in said path is the guiding means. This last-named means may comprise a guide member extending along opposite sides of said path and having slots for snugly engaging the flanges or wings of the half-plates. The ends of the slots adjacent the loading means may be flared to facilitate entrance of the flanges into the slots. The snug fit between the flanges and the walls of the slots restrain flexed half-plates against relaxation and assure guidance of the plates in a desired path. The guiding means also is provided with a plurality of slots extending to a restricted portion of the path of the flanges referred to. The welding means includes a plurality of disc-shaped electrodes extending through the last-named slots and adapted to weld the restricted portion referred to of the half-plates. The switching means includes a plurality of switches and a lever extending into the guiding means and adapted to be tripped successively by a half-plate assembly moving in the guiding means, and by the chain supported feeding member aforementioned. The lever has a free end and is disposed to one side of the axes of the welding discs so as to actuate the switches to closed and open positions slightly after the leading ends of the half-plates have passed the welding discs and slightly before the trailing ends thereof have passed the disc electrodes, respectively. This avoids welds at the ends of the half-plates, and contributes to desired end uniformity of the welded structures.

The novel features which are believed characteristic of the invention are set forth with particularity in the appended claims. The invention itself, however, will be understood best by referring to the following and more detailed description of an embodiment thereof taken in connection with the appended drawing in which:

Figure 6:
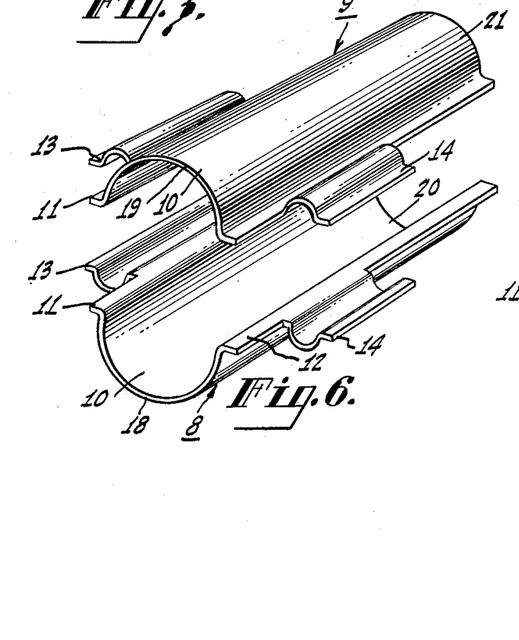
Figure 6 is an exploded perspective view of two half-plates adapted to be advantageously welded by the apparatus of the invention.
Figure 7:
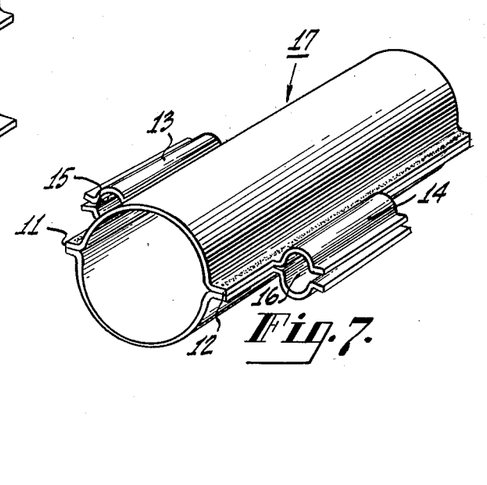
Figure 7 is a perspective view of the tubular structure formed after the half-plates referred to have been welded together.

Referring now to the drawing in more detail, and considering first the work pieces to be welded by the apparatus of the invention, it will be noted from Figure 6 that such work pieces each comprise a trough-shaped half-plate 8 having a trough 10, side flanges or wings 11, 12 and trough-shaped ears 13, 14. Two of said half-plates, 8, 9, are properly registered and welded together at their flanges 11, 12 as shown in Figure 7 to provide a tubular electrode structure 17. The ears 13, 14 thereof combine to form tubular spaces 15, 16 into which are adapted to be extended supporting means, such as ceramic rods, not shown, for fixing the electrode structure in an electron gun assembly.

It will be noted that the shape of the half-plates 8, 9 shown in Figure 6 is characterized by a high degree of irregularity due to the ears 13, 14 extending therefrom. Furthermore, the half-plates sometimes become deformed during handling so that the trough portions 10 thereof are not truly semi-circular, as is required for forming a tubular electrode of circular cross-section for an electron gun assembly.

The foregoing characteristics of the work pieces, renders it difficult to devise an automatic welding apparatus for welding the flanges 11, 12 of the work pieces to provide a structure having the features of true roundness in cross-section and in which two work pieces are accurately registered so that their ends 18, 19 and 20, 21 lie in spaced parallel planes normal to the axes of the work pieces. The difficulty arises because not only is it necessary to accurately register the half-plates as indicated, but also to flex any deformed half-plates to true semi-circular shape, and hold the plates in these positions during a welding operation. Furthermore, it is desirable to space the welds from the ends of the tubular electrode 17 so as to preserve the uniformity of said ends. In addition, to preserve the flanges 11, 12 from deformation during welding, it is desirable that the flanges be held in contacting position by means other than the welding electrodes during a welding operation.

The automatic assembling and welding apparatus of the invention effectively overcomes the aforementioned difficulties by a structure comprising a novel loading and flexing means, feeding means, guiding and holding means, and a welding system including roller or disc type electrodes and a novel switching means for controlling energy to the electrodes. The automatic assembling and welding apparatus of the invention will be described in detail in the following.

General features

Figure 1:
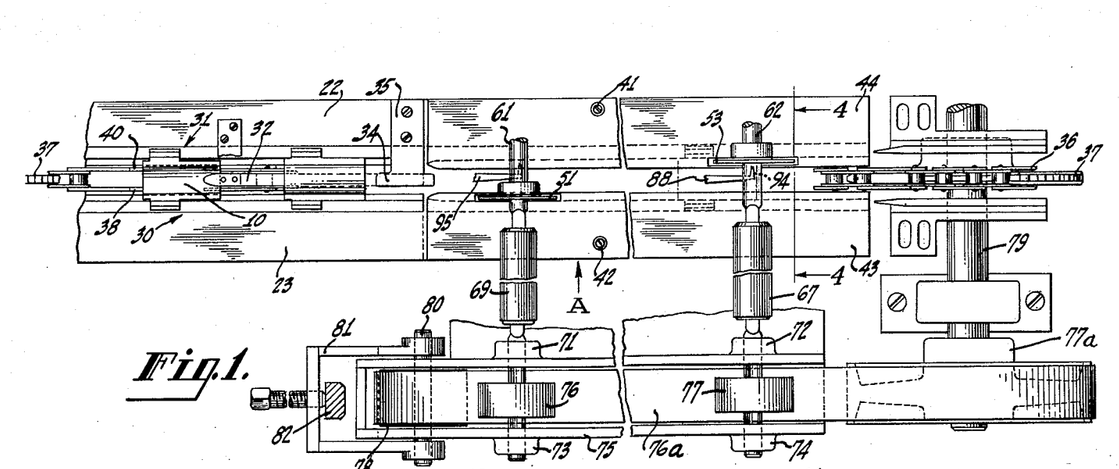
Figure 1 is a plan view of an apparatus constructed in accordance with the invention.
Figures 4, 5:
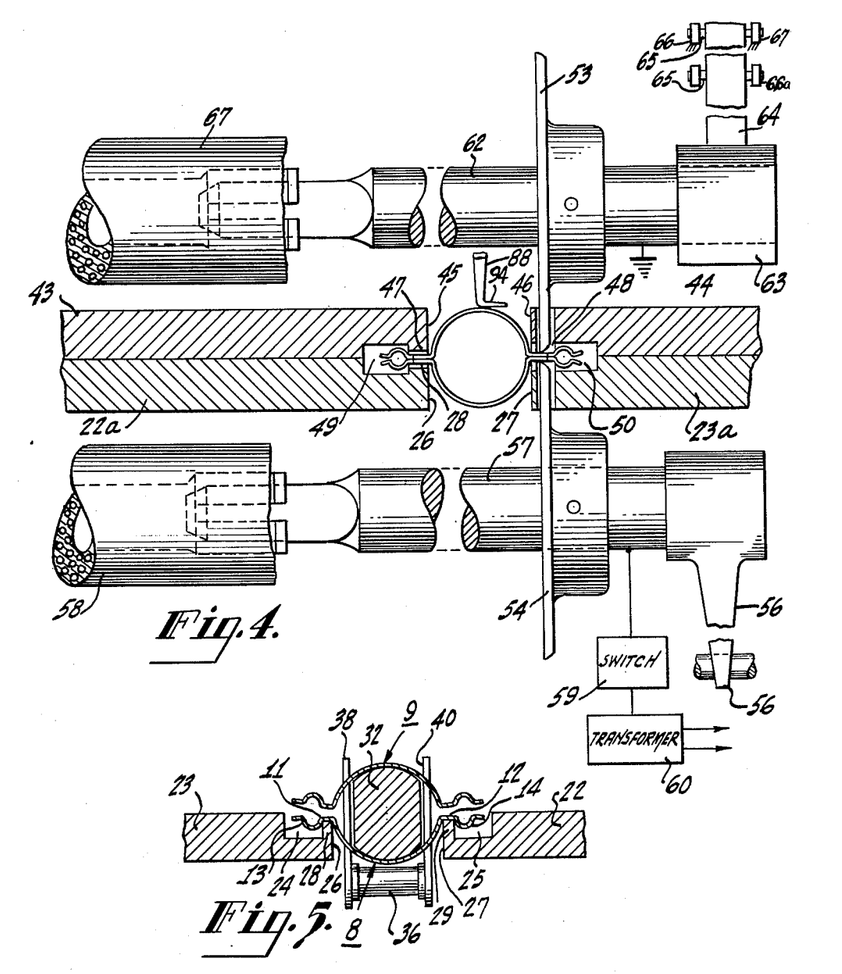
Figure 4 is a view in cross-section taken along the lines 4—4 of Figure 1, and shows the guiding means, the disc-shaped welding electrodes and the switch actuating lever in operative position with respect to two half-plates to be welded.
Figure 5 is a view in cross-section taken along the lines 5—5 of Figure 2, and shows the positions of the half-plates in the loading means according to the invention.

In one embodiment of the invention an automatic assembling and welding apparatus may include two spaced tracks 22, 23 having a relatively wide expanse for service as a table, as shown in Figure 1. The tracks are fixed to suitable supports, not shown, with upper surfaces extending horizontally. As shown in Figure 5, the tracks referred to are provided with longitudinal grooves 24, 25 adjacent their facing sides 26, 27 defining flanges 28, 29 along which a lower half-plate 8 may slide. The facing sides 26, 27 are critically spaced so that the flanges 28, 29 of the tracks engage the flanges or wings 11, 12 of a half-round half-plate 8. The grooves 24, 25 provide the necessary space for accommodating the ears 13, 14 of the half-plate. The tracks 22, 23 may extend from one end of the operating zone of the apparatus to the other and provide a continuous support for the lower half-plate during processing thereof by the apparatus.

Along the tracks 22, 23 are oriented the loading and flexing means, the feeding means, the guiding means, and the welding system of the invention.

The loading and flexing means

The loading means comprises a structure providing two loading stations spaced along the tracks 22, 23. One loading station comprises an exposed portion of the flanges 28, 29 indicated at 30, 31 in Figures 1 and 3. This exposed portion is long enough to receive half-plate 8 with the trough portion 10 thereof extending downwardly and between the facing surfaces 26, 27 of the tracks, with the flanges 11, 12 of the work pieces resting on flanges 28, 29 of the tracks and with the ears 13, 14 of the work pieces received in grooves 24, 25. This provides good support for half-plate 8 and disposes it in axially parallel relation to the tracks referred to.

The finished tubular structure shown in Figure 7, may have a desired radius of 0.25 inch. To flex half-plates fed to the loading station referred to, so as to be characterized by this radius, the spacing between facing edge surfaces 26, 27 of the tracks is 0.5 inch. Therefore, when half-plate 8 is firmly seated on flanges 28, 29 of the tracks, the trough portion 10 of the half-plate is flexed by the flanges referred to a semi-circular shape having a radius of 0.25 inch. This flexing action occurs whether the plates loaded are initially flattened to a larger radius than 0.25 inch or compressed to a smaller radius than indicated.

When the original radius is larger than 0.25 inch the flexing action will occur by engagement of the flanges 28, 29 with the trough portion 10 resulting in compression of the trough to reduce its radius to the desired value. When the original radius of the half-plate 8 is less than 0.25 inch, the upper surfaces of the flanges 28, 29 will engage the curved surfaces of the ears 13, 14 and by sliding thereacross, cause a flattening of the trough to the radius desired. In this connection, it will be noted the upper surfaces of flanges 28, 29 and the flanges 11, 12 of the half-plate are of substantially equal width (Figure 5) so that when the half-plate is urged into the position shown by a flexure thereof, there is no possibility of the plate moving farther than its correct position, whether compressed or flattened during the loading operation.

Figure 2:
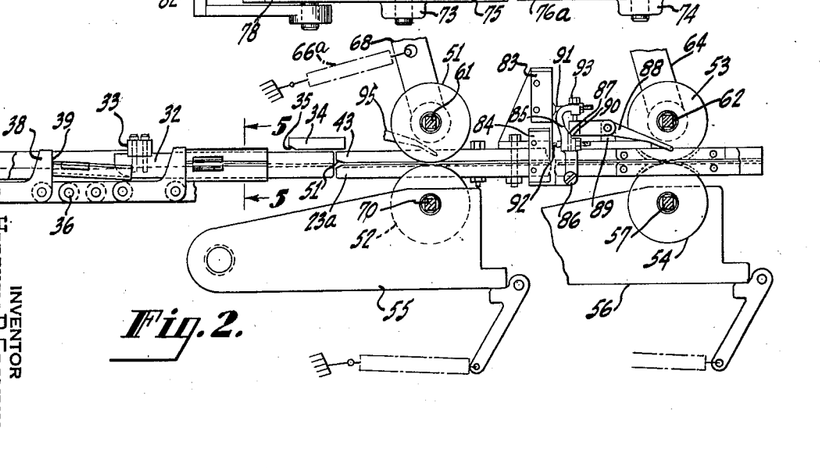
Figure 2 is a general view partly in section in the direction indicated by the arrow "A" in Figure 1.

The other loading station includes a rounded mandrel 32 supported by bracket 33 to extend parallel with and between the tracks 22, 23 as shown in Figures 1, 2, 3 and 5. This station also includes a member 34 supported on bracket 35 (Figures 1, 2 and 3) above an end portion of mandrel 32 remote from mandrel supporting bracket 33. The function of this member is to prevent upward movement of the unsupported end of the mandrel, and to engage the outer surface of the trough 10 of an upper half-plate 9 to cause said trough to engage the rounded upper surface of the mandrel. The upper rounded portion of the mandrel engaged by the upper half-plate has a curvature characterized by a radius of 0.25 inch which is the desired curvature of the trough, as aforementioned. Therefore, if a half-plate 9 loaded on mandrel 32 has a greater or smaller curvature than of 0.25 inch radius, it will be flexed to this curvature by the combined action of the upper rounded surface of the mandrel 32 and the member 34. To facilitate feed of a half-plate between the member 34 and the mandrel 32, one end of said member is provided with a beveled edge 35 as shown in Figure 2. The mandrel is provided with flattened sides for a purpose to be described.

The feeding means

It will be noted from the foregoing dscription of the loading and flexing means, that two half-plates required for the tubular structure shown in Figure 7, are loaded on the apparatus of the invention in axially off-set and axially parallel relation. To dispose the plates in desired coextensive and face registering relation required for forming the structure referred to, a feeding means is provided.

The feeding means includes an endless chain 36 mounted upon two spaced sprocket wheels, one of which is shown at 37 in Figure 1, to provide a rectilinear portion of the chain disposed below the tracks 22, 23 and parallel thereto and in registry with the space therebetween defined by the surfaces 26, 27 of the tracks. The sprocket wheel 37 may be connected to a power source, not shown, for moving the chain so that the rectilinear portion thereof referred to moves from left to right as viewed in Figures 1, 2 and 3.

Fixed to the chain 36 at portions thereof spaced appreciably more than the length of a half-plate, are a plurality of lugs or pushers 38, 40 having leading edges 39 extending upwardly between the tracks 22, 23 and slightly above the upper half-plate 9 for a purpose to be described. The leading edges referred to are disposed at right angles to the rectilinear portion referred to of the chain, and are therefore also at right angles with respect to the tracks 22, 23 and the axes of the two half-plates 8, 9 loaded on the apparatus. Movement of the chain therefore causes one group of the lugs 38, 40 to engage an end of lower half-plate 8 and push it to the right as viewed in Figures 1, 2 and 3 along the flanges 28, 29 of the tracks 22, 23.

In order to permit travel of the pushers 38, 40 past mandrel 32 of the loading means, the sides of the mandrel are flattened as aforementioned to reduce the lateral extent of the mandrel. The two pushers 38, 40 utilized for each pushing operation, are fixed to opposite sides of the chain 36, as shown in Figure 5. This spaces the pushers referred to sufficiently so that they are adapted to pass along both flattened sides of the mandrel 32.

Continued movement of the pushers results in travel of the lower half-plate 8 to the right (Figure 2) and engagement of the pushers with an end of the half-plate 9 loaded on mandrel 32. When ends of both half-plates are engaged by the pushers, the plates are disposed in coextensive relation with the inner surfaces of the troughs thereof in facing relation. Further movement of the pushers, causes the upper half-plate to engage the bevelled end 35 of the member 34 as a result of which the plate is flexed to desired radius as aforementioned. The plates are now disposed in desired position relative to each other required for welding to provide the tubular structure shown in Figure 7.

The guiding means

It is not convenient to weld the half-plates together immediately after they have assumed the desired positional relationship, aforementioned, for reasons which will appear in the following. Therefore, a guiding means is provided for guiding the half-plates in the relative positions determined by the loading means, to a welding location. The guiding means is in registry with the loading means for facilitating transfer of the half-plates to the guiding means.

The guiding means may comprise spaced lower bars 22a, 23a as shown in Figure 4 which may be continuations of the tracks 22, 23 shown in Figure 1, and therefore include the flanges 28, 29 and facing side surfaces 26, 27. Fixed to the lower bars 22a, 23a by suitable means such as bolts 41, 42 shown in Figure 1 are two upper bars 43, 44 having facing side surfaces 45, 46 and flanges 47, 48 opposing the flanges 28, 29 on the lower bars 22a, 23a. The thickness of the bars at the flanges referred to is reduced to permit snug entrance therebetween of two registering welding flanges on the half-plates, to preserve the relationship between two half-plates determined by the loading means. The bars referred to also define two passageways 49, 50 for accommodating the ears 13, 14 of the half-plates. To facilitate entrance of two half-plates into the guide referred to, the end of the upper bars 43, 44 adjacent the mandrel 32 of the loading means referred to, may include a beveled portion 51 as shown in Figure 2. Thus, as the half-plates loaded on the apparatus are moved by the pushers 38, 40 to the right (Figure 2) the flanges 11, 12 and ears 13, 14 of the half-plates enter the spaces between the flanges 26, 47 and 29, 48 and the spaces 49, 50, defined by the bars referred to. In view of the snug fit aforementioned, between the flanges on the half-plates and the flanges referred to on the bars, the half-plates are held in desired contacting relation for good welds. Furthermore, since the pushers continue to engage an end of the half-plates, they are urged into the required face registering relation for forming the structure shown in Figure 7.

The welding system

The welding system in an apparatus embodying the invention includes two pairs of opposed disc-shaped welding electrodes 51, 52, 53, 54 shown in Figure 2. The lower welding electrodes 52, 54 are mounted for rotation on demountable fixed supports 55, 56, which may be made of an insulating material such as Bakelite. Figure 4 shows the welding electrode 54 and the mounting therefor. The mounting includes a shaft 57, one end of which is engaged by support 56 and the other end of which is squared and received in a square opening in an end of an insulating flexible shaft 58, from which the electrode referred to is quickly detachable. Power to the electrode is supplied through two micro-switches 59 shown schematically in Figure 4 and structurally in Figure 2 and to be more fully described in the following. The micro-switches referred to are connected to transformer 60 which in turn is connected to a suitable alternating current power source as indicated by the two arrows. Lower welding electrode 52 is mounted in a similar way on shaft 70.

The upper welding electrodes 51, 53 are fixed to shafts 61 and 62 respectively. Further mounting of the welding electrodes 51, 53 is illustrated in Figure 4 wherein the mounting of electrode 53 is shown. One end of shaft 62 is mounted for rotation in bearing 63 of lever 64. Lever 64 is mounted for pivotal movement on shaft 65 which is fixed to support 66, 67 shown schematically. Intermediate the bearing 63 and shaft 65, the lever 64 is engaged by a spring 66a for urging electrode 53 against electrode 54. The other end of the shaft is squared and received in a square hole in flexible shaft 67. The shaft 62 is connected to ground as shown schematically, for grounding electrode 53. Welding electrode 51 is mounted in like manner on lever 68 and flexible shaft 69 shown in Figures 1 and 2.

The shafts 57, 61, 62 and 70 (Figure 2) to which the welding electrodes 54, 53, 51 and 52 are fixed are connected through flexible shafts, three of which are shown in Figures 1 and 4 at 58, 67, and 69, to four additional shafts, two of which are shown at 71 and 72 in Figure 1. Shafts 71, 72 are mounted in bearings 73, 74 fixed to bracket 75. Pulleys 76, 77 are fixed to shafts 71, 72 respectively. Similar pulleys, shafts, bearings and support are provided in connection with the lower electrodes 52, 54.

The pulleys serving electrodes 51, 52 are disposed one above the other with adjacent peripheral portions spaced slightly from each other. The pulleys serving electrodes 53, 54 are mounted in like manner, resulting in an array wherein two upper pulleys are mounted above two lower pulleys.

Means are provided for rotating the pulleys which in turn imparts rotation to the welding electrodes 51, 52, 53, 54. This means comprises endless belt 76a mounted on spaced spindles 77a, 78 to provide a straight portion of the belt extending between and engaging the upper and lower pulleys aforementioned. Spindle 77a is mounted on power shaft 79, on which sprocket wheel 37 shown in Figure 1, is also mounted. Shaft 79 is connected to a suitable power source not shown, for transmitting either constant or intermittent motion to the chain 36 and belt 76a. Spindle 78 is mounted on shaft 80 for rotation. Shaft 80 engages the arms of U-shaped bracket 81. In the transverse portion of bracket 81 is provided an adjusting screw bearing against fixed member 82, for adjusting the tension on belt 76a.

Means are also provided for energizing the welding electrodes during a welding operation. This means includes two micro-switches for each of the two opposed welding electrodes. Two micro-switches 83, 84, for the welding electrodes 53, 54 are shown in Figure 2. Micro-switch 83 is normally closed and micro-switch 84 is normally open. The length of thrust for actuating switch 83 is longer than that required to actuate switch 84 for a purpose which will become clear. Mounted adjacent the switches 83, 84 is a switch actuating member 85 pivoted on pin 86 and having an inclined surface 87. A lever 88 pivoted on support 89 is provided with a beveled end 90 engaging the inclined surface 87. The member 85 is normally urged against the beveled end of lever 88 by outwardly urged pins 91, 92 extending from the micro-switches 83, 84.

The lever 88 extends downwardly into the space between the opposing edge surfaces 26, 27 of the guide members 43, 44 aforementioned and about 1/16 inch to the right of the outer of electrodes 53, 54 as viewed in Figure 1. The vertical position of lever 88 is adjustable by screw 93, so that it is tripped upwardly by the leading end of an upper half-plate traveling along the guide member aforementioned to a value sufficient to cause member 85 to close the normally open switch 84. Since the free end of the lever extends to the right of the center line of electrodes 53, 54, a weld is commenced after a leading end portion of the half-plates has traversed the electrodes to a distance of about 1/16 inch. The welding operation continues until lever 88 is further tripped by the upper portion of pusher 40 shown in Figure 5. In order that the finger 88 may engage the top of half-plates traveling through the guide member aforementioned and also be engaged by pusher 40, it includes a transverse portion 94 shown in Figure 4. Since the upper end of pusher 40 extends above the upper half-plate being welded, the lever 88 is tripped upwardly farther than it was tripped by the upper half-plate when the welding operation started. This causes the lever to transmit a longer thrust to the normally closed switch 83 through member 85, than was transmitted to the normally open switch 84, resulting in an opening of switch 83 to stop the welding operation. In view of the extension of the pushers to a location above the upper half-plate being welded, the lever 88 engages the pusher referred to before the trailing end of the half-plates has reached the welding electrodes and stops energization of the welding electrodes before a trailing end portion is welded. By making the pusher 40 of suitable height, the unwelded trailing end portion may have a desired length of 1/16 inch.

Figure 3:
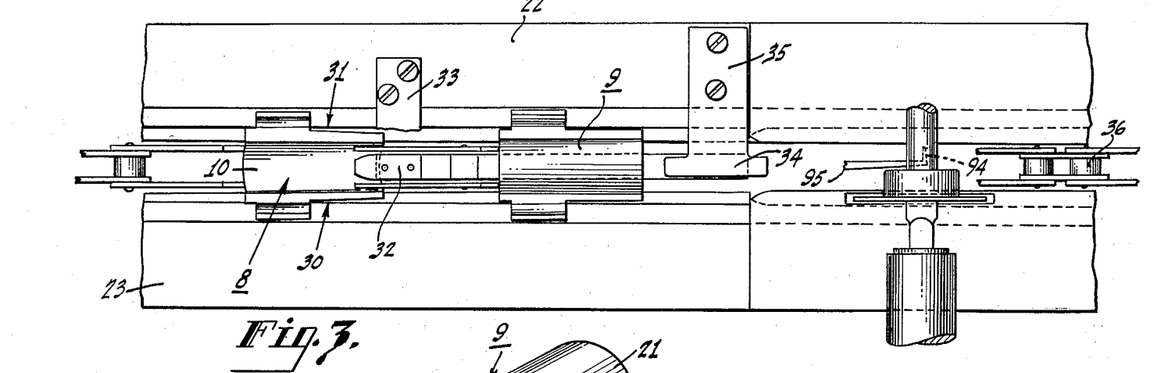
Figure 3 is an enlarged plan view of a portion of the apparatus shown in Figure 1 and depicts the loading means of the apparatus.

A similar arrangement of micro-switches is provided for controlling the energization of welding electrodes 51, 52, the lever 95 of such arrangement being shown in Figures 1, 2 and 3.

*Operation of the apparatus*

In operation, and assuming the upper portion of chain 36 and pushers 38, 40 thereon are moving at a constant and relatively low velocity in the direction of from left to right in Figure 1, an operator may load both loading positions simultaneously using both hands. The only care required on the part of the operator is to deposit a half-plate in the first loading position with the trough thereof extending downwardly, and with the ears 13, 14 disposed adjacent the left-hand end of the plate; and to deposit a plate in the second loading position with the trough thereof extending upwardly and the ears 13, 14 of the plate in a position similar to that aforementioned.

Due to the relatively slow movement of the pushers 38, 40, the loading operation can easily be performed while an approaching pusher group is on the way to the loading stations. After the half-plates have been loaded on the apparatus as aforementioned, all subsequent operations thereon, including assembling and welding, are automatically performed by the apparatus and finished welded tubular structures illustrated in Figure 7 are delivered by the apparatus at its right hand end, as viewed in Figure 1, where they may be collected by suitable means, such as a hopper, not shown.

The first automatic operation of the apparatus on the half-plates after they have been loaded, is to move the half-plates into face registry, by means of pushers 38, 40. Further movement of the half-plates causes the upper half-plate to engage the beveled edge 35 of member 34 resulting in flexing the upper half-plate into engagement with the upper surface of mandrel 32 to form the trough of the plate to semi-circular shape. Further pushing of the half-plates causes their flanges 11, 12 and ears 13, 14 to enter the T-shaped slots defined by the guide members 22a, 23a, 43, 44 as shown in Figure 4. Further travel of the half-plates to the right causes engagement between the upper half-plate and lever 95, resulting in energization of welding electrodes 51, 52 to weld the flanges 11, 11 on one side of the half-plates. Still further travel of the half-plates causes the pusher 40 to engage lever 95 to stop energization of the electrodes 51, 52, and end the welding operation.

A further welding operation takes place when the half-plates are moved further to trip lever 88. The sequence of steps is the same as that following the tripping of lever 95, except that a weld is made between flanges 12, 12 on the other side of the work pieces. After the second weld has been made, the structure shown in Figure 7 is complete.

It will be noted from Figures 1 and 4, that the flanges 11, 12 of the half-plates are securely held against deflection or other movement, during a welding operation, on all sides of the area thereof being welded. This prevents the pressure of the welding electrodes on the flanges from deforming the flanges. This is important, since the tubular end product must be free from any deformation in view of its ultimate service as an electrode in an electron gun assembly.

The invention therefore provides a novel and advantageous assembling and welding apparatus which automatically assembles work pieces in desired position and welds the work pieces together without displacing the work pieces from their assembled position or impairing their form in any way. Furthermore, the apparatus is easily disassembled for cleaning or for repairs. If desired, the electrodes may be cooled in well known manner, such as by a liquid coolant.

While the described embodiment of the invention has utility in assembling and welding half-plates shown in Figure 6, it is obvious that the apparatus may be modified to weld work pieces of other shapes without departing from the spirit of the invention.

What is claimed is:

1. An assembling and welding apparatus comprising a fixed support having an elongated slot in one side thereof adapted to receive portions of work pieces to be joined in welds, movable means movable in a path adjacent said support and adapted to engage said work pieces for moving said work pieces along said slot with said portions engaged by said slot, said support having a slot in another side thereof communicating with the first-named slot, and a welding electrode extending into said second-named slot and adapted to contact said portions as said work pieces are moved in the first-named slot, for welding said portions.

2. An assembling and welding apparatus comprising a fixed support having an elongated slot in one side thereof adapted to receive portions of work pieces to be joined in welds, movable means movable in a path adjacent said support and adapted to engage said work pieces for registering said portions and for moving said work pieces along said slot with said portions engaged by said slot, said support having a slot in another side thereof communicating with the first-named slot, and a welding electrode extending into said second-named slot and adapted to contact said portions as said work pieces are moved in the first-named slot, for welding said portions.

3. An assembling and welding apparatus comprising an elongated structure, loading and flexing means adjacent one end of said structure for receiving in off-set relation two work pieces to be welded, a welding electrode mounted on said structure and spaced therealong from said loading and flexing means, guide means between said loading and flexing means and said welding electrode adapted to guide the travel of said work pieces from said loading and flexing means to said welding electrode, and feed means movable along said structure adapted to engage said work pieces for disposing them in co-extensive relation and for moving said work pieces in said guide means to said welding electrode for welding said work pieces.

4. Apparatus for automatically registering and welding two semi-cylindrical work pieces to form a tubular member, said apparatus comprising an elongated structure, means fixed adjacent one end of said structure and adapted to receive one of said work pieces with the inner surface thereof facing a predetermined direction, means fixed to said structure and adjacent said first-named means and adapted to receive the other of said work pieces with the inner surface thereof fixing a direction opposite to said predetermined direction, guide means extending along said structure and having one end adjacent said second-named means and defining a path for said work pieces, a welding electrode mounted on said structure and extending into said path, and means for moving said work pieces into co-extensive relation and in said path to said welding electrode for joining said work pieces in a weld.

5. An assembling and welding apparatus comprising an elongated structure, receiving means fixed to said structure for receiving in off-set relation two work pieces to be welded, elongated guide means extending from said receiving means along said structure and having a longitudinal slot for engaging a portion of said work pieces, a welding electrode extending into said slot, movable means mounted for movement along said structure and adapted to engage said two work pieces for first disposing said work pieces in coextensive relation and then moving said work pieces along said guide means and in said slot, whereby said work pieces are caused to move in a predetermined path, and a lever extending into said path adjacent said welding electrode and adapted to close an energizing circuit for said welding electrode, whereby said lever is adapted to be tripped by work pieces adjacent said welding electrode for welding said work pieces.

6. An assembling and welding apparatus comprising an endless chain mounted at spaced portions thereof to provide a horizontal rectilinear portion, spaced lugs fixed to and extending outwardly from said chain, said chain being adapted to move in a vertical plane, a fixed table supported above said rectilinear portion of the chain, said lugs extending through said table, guide means mounted on said table for defining a predetermined path parallel to said rectilinear portion of said chain, said lugs extending into said path, whereby work pieces mounted on said guide means are adapted to be moved in said path, and a welding electrode mounted on said table and extending into said path, whereby said work pieces are adapted to be welded while moved in said path.

7. An assembling and welding apparatus comprising two spaced receiving means adapted to receive two work pieces in offset relation, guide means adjacent said receiving means and in alignment therewith, said guide means having spaced parallel slots for receiving spaced portions of said work pieces, welding electrodes extending into said slots, switching means including levers for energizing said welding electrodes, said levers extending into said guide means and adapted to be tripped by said work pieces moving in said guide means, and means extending into said guide means for moving said work pieces in co-extensive relation therein to said welding electrodes, whereby said work pieces are welded together.

8. Apparatus for laterally registering and welding elongated work pieces, comprising an elongated structure having a plurality of processing means extending therealong, said processing means including two adjacent receiving members adapted to receive two work pieces in off-set and axially parallel relation; an elongated guide member extending from one of said receiving members, said guide member having two spaced and facing surfaces extending along said structure, said surfaces having longitudinal slots adapted to receive and guide spaced portions of said work pieces; welding electrodes extending into said slots; and movable means having a leading edge extending normal to the axes of the work pieces and adapted to move said work pieces into lateral registry, said movable means being mounted for movement from said receiving members and along said guide member between said two facing surfaces thereof, whereby said work pieces are adapted to be moved in laterally registering relation to said welding electrodes for welding said work pieces.

9. In an assembling and welding apparatus including a welding station: a receiving station for receiving semi-cylindrical work pieces having lateral ears to be welded, said station including a portion of two parallel bars adapted to receive the ears of one of said work pieces, said bars being spaced for receiving therebetween a portion of said one of said work pieces, and a mandrel spaced from and co-extensive with another portion of asid bars and adapted to receive the inner cylindrical surface of another of said work pieces, whereby said work pieces are adapted to be received with their inner surfaces in off-set facing relation; and a movable member extending between said bars and adapted to engage successively end portions of said work pieces for disposing the same in lateral registry and moving the work pieces to said welding station while maintained in said registry.

10. An assembling and welding apparatus for welding trough-shaped work pieces having lateral ears to form a tubular structure, said apparatus including a receiving station, a welding station and means for moving the work pieces through said stations: said receiving station including two spaced tracks having an exposed portion for receiving one of said work pieces with the trough thereof extending between the tracks, and a mandrel adjacent another portion of said tracks and adapted to receive another of said work pieces with the trough thereof extending upwardly and in axial parallel relation and out of face registry with said one of said work pieces; said welding station including a guide having longitudinal slots extending from said receiving station and adapted to receive the lateral ears of two of said work pieces, said guide having additional slots, and welding electrodes extending through said additional slots to said longitudinal slots and adapted to weld said lateral ears of work pieces fed through said longitudinal slots; and means for first moving work pieces at said receiving station into face registry and then moving said work pieces in said registry to said welding electrodes with said ears engaged by said longitudial slots, for welding said ears.

11. An assembling and welding apparatus for joining two half-plates to form a tubular electrode having tubular ears for fixing in an electron gun assembly and lateral flanges for welding, said apparatus comprising a loading and flexing station for receiving two of said half-plates in longitudinally displaced and axially parallel relation and flexing said half-plates to true semi-circular shape, a guide having a flared end adjacent said loading station adapted to receive said two half-plates from said loading station, said guide having two spaced slots of T shape cross-section, said slots defining a relatively large inner passageway for receiving said ears without deforming the same, and a relatively narrow passageway for receiving and urging together into contact relation said lateral flanges of said two of said half-plates, said guides having additional slots communicating with said relatively narrow passageway, electrodes extending through said additional slots and into said passageway, and movable means extending into said loading station and said guide for first moving said two of said half-plates into co-extensive relation and then into said guide and to said welding electrodes for welding said flanges.

12. An assembling and welding apparatus for joining two trough-shaped plates to form a tubular member, wherein said plates have longitudinal flanges extending from opposite sides thereof, said apparatus comprising a guide having two spaced parallel surfaces defining a passageway, said surfaces each having slots parallel to said passageway and adapted to receive said longitudinal flanges, said guide having other surfaces normal to said two surfaces, said other surfaces having slots communicating with said first-named slots, welding electrodes extending through said last-named slots and across said first-named slots, said electrodes being yieldably mounted for permitting passage of said flanges in said first-named slots, and movable means extending between said parallel surfaces for moving said flanges in said parallel slots against said electrodes for welding said flanges.

13. In an assembling and welding apparatus, guide means for guiding work pieces in a predetermined path, movable means for moving said work pieces in said path, a welding electrode in said path for welding said work pieces, and means for energizing said welding electrode, said means including two switches connected across a power supply for said electrode, one of said switches being normally open and the other of said switches being normally closed, a lever connected to said switches and extending into said path, whereby said lever is adapted to be tripped a predetermined distance by a work piece moving in said path for closing said normally open switch to start a welding operation, said movable means extending farther into said path than said lever and adapted to engage the trailing end of said work pieces, whereby said lever is adapted to be further tripped a distance greater than said predetermined distance by said movable means to open said normally closed switch for stopping the welding operation.

14. An assembling and welding apparatus comprising loading means adapted to receive work pieces in non-registering relation and defining a predetermined path, guiding means adjacent said loading means and in end registry with said predetermined path and defining a further predetermined path for said work pieces, welding electrodes extending into said further predetermined path, movable means for moving said work pieces into registry in said predetermined path and into said further predetermined path, and switch means for starting and stopping energization of said electrodes, said switch means including a lever extending into said further predetermined path and adjacent said electrodes, whereby said lever is adapted to be given a predetermined deflection by the leading ends of work pieces moving in said further predetermined path for starting energization of said electrodes, said movable means extending farther into said further predetermined path than said lever and engaging the trailing ends of said work pieces, whereby said lever is given a further deflection by said movable means for stopping energization of said electrodes after a welding operation.

15. An assembling and welding apparatus comprising a loading means, a guiding means in registry with said loading means and adjacent thereto, welding means in said guiding means, and movable means movable through said loading means and guiding means and adapted to move work pieces to be welded from said loading means and to said welding means, said movable means being mounted for movement in a path including a portion of said welding means for stopping a welding operation.

16. An assembling and welding apparatus according to claim 15 and wherein said loading means includes a rail having an exposed portion for receiving one of said work pieces, and a mandrel co-extensive with and adjacent another portion of said rail, whereby said work pieces may be loaded in different positions for providing a predetermined welded structure.

17. An assembling and welding apparatus according to claim 15 and wherein said guiding means comprises two spaced members having facing surfaces, said surfaces having slots for receiving portions of said work pieces for guiding said work pieces in a predetermined path, said members having other surfaces normal to said facing surfaces, said other surfaces having slots extending to said first-named slots, and adapted to receive said welding electrodes for welding said portions of said work pieces.

18. A welding apparatus according to claim 15 and wherein said movable means includes an endless chain having a section adjacent and parallel to said loading means and said guiding means, said chain including a plurality of links, spaced ones of said links including two parallel lugs extending outwardly from said chain from opposite sides thereof, said two lugs being adapted to engage an end of work pieces at spaced portions of said end for rectilinearly moving said work pieces, said chain being movable to cause said lugs to move through said loading means and said guiding means, said lugs having a predetermined length whereby they extend from said chain and beyond the side of said work pieces remote from said chain, for actuating said welding means to non-welding position.

19. A welding apparatus according to claim 15 and wherein said welding means includes two opposed disc-shaped electrodes resiliently urged into peripheral engagement within said guiding means and adapted to be separated by work pieces moving in said guiding means and to exert appreciable pressure on said work pieces, two switches for starting and stopping energization of said electrodes, a lever connected to said switches, one of said switches being normally open and responsive in closing to a relatively short movement of said lever, the other of said switches being normally closed and responsive in opening to a relatively long movement of said lever, said lever extending into said guiding means, whereby said lever is adapted to be moved in progressively longer movements by a leading end of said work pieces to start welding and by said movable means to stop a welding operation.

20. An assembling and welding apparatus comprising an elongated structure, loading and flexing means adjacent one end of said structure, guiding means adjacent said loading and flexing means and extending towards the other end of said structure, a welding electrode extending into said guiding means, and movable means extending into said loading and flexing means and said guiding means and movable in a path parallel to said elongated structure; said guiding means defining a predetermined path adapted to receive two work pieces of predetermined shape; said loading and flexing means including two rails for receiving and flexing one of said work pieces to said predetermined shape, a mandrel having said predetermined shape and a member adjacent said mandrel for urging the other of said work pieces against said mandrel to said predetermined shape; said movable means being adapted to move said work pieces in said path to said welding electrode for welding said work pieces.

21. An assembling and welding apparatus comprising a welding means, a first loading means spaced from said welding means adapted to receive a manually force loaded work piece and to automatically flex said work piece to predetermined shape in response to the forced loading thereof, a second loading means adjacent said first loading means and extending towards said welding means, said second loading means being adapted to receive another work piece and automatically flex it to predetermined shape by movement of said work piece through said second loading means, movable means movable through said first and second loading means and adapted to engage and move said work pieces through said loading means and to said welding means, and means adjacent said welding means for forcefully and slidingly engaging said work pieces for preserving said predetermined shapes thereof during a welding operation for providing a welded structure having critical dimensions.

22. An assembling and welding apparatus comprising: guiding means adapted to slidingly engage work pieces to be welded and to restrict movement thereof to a predetermined path; a feeding means including a movable member having a free end extending to one side of said path, and adapted to engage a trailing end of said work pieces and push said work pieces in a predetermined direction; and welding means including two opposed disc-shaped welding electrodes having portions in peripheral engagement in said path, said electrodes being axially spaced in a plane perpendicular to said path, and a switch for successively connecting said electrodes to an electrical energy source, said switch including a lever extending into said path from said one side thereof, said lever having a free end extending beyond said plane in said predetermined direction, whereby said lever is adapted to be tripped by an advancing end of said work pieces after said end has engaged said welding electrodes for closing said switch and starting a welding operation at a portion of said work pieces spaced from said advancing end thereof, an intermediate portion of said lever being spaced from said plane in a direction opposite to said predetermined direction and disposed in the path of travel of said free end of the movable member, whereby said movable member is adapted to open said switch to stop the welding operation before the trailing end portion of the work pieces has reached said welding electrodes.

References Cited in the file of this patent

UNITED STATES PATENTS

| Number | Name | Date |
|---|---|---|
| 1,848,271 | Phelps | Mar. 8, 1932 |
| 1,989,486 | Matthaei | Jan. 29, 1935 |
| 2,210,056 | Biederman | Aug. 6, 1940 |
| 2,549,173 | Cogan | Apr. 17, 1951 |